US012481560B2

(12) United States Patent
Gunda et al.

(10) Patent No.: US 12,481,560 B2
(45) Date of Patent: Nov. 25, 2025

(54) JUST IN TIME REMOVAL OF CORRUPTED INFO AND FILES FROM BACKUPS ON RESTORE

(71) Applicant: EMC IP Holding Company LLC, Hopkinton, MA (US)

(72) Inventors: Kalyan C. Gunda, Bangalore (IN); Chris E. Rowen, Bedford, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/380,920

(22) Filed: Jul. 20, 2021

(65) Prior Publication Data
US 2022/0382640 A1 Dec. 1, 2022

(30) Foreign Application Priority Data
May 27, 2021 (IN) .............................. 202111023663

(51) Int. Cl.
G06F 11/00 (2006.01)
G06F 11/14 (2006.01)
G06F 21/56 (2013.01)
G06F 21/62 (2013.01)

(52) U.S. Cl.
CPC ...... G06F 11/1451 (2013.01); G06F 11/1435 (2013.01); G06F 11/1469 (2013.01); G06F 21/568 (2013.01); G06F 21/6245 (2013.01)

(58) Field of Classification Search
CPC ............. G06F 11/1451; G06F 11/1435; G06F 11/1469; G06F 21/568; G06F 21/6245
See application file for complete search history.

(56) References Cited

U.S. PATENT DOCUMENTS

| 8,234,468 | B1* | 7/2012 | Deshmukh | G06F 11/1453 |
| | | | | 711/E12.103 |
| 8,499,351 | B1* | 7/2013 | Fredericksen | G06F 21/57 |
| | | | | 709/224 |
| 8,954,796 | B1* | 2/2015 | Cohen | G06F 11/2064 |
| | | | | 707/674 |
| 9,317,686 | B1* | 4/2016 | Ye | G06F 21/568 |
| 9,501,234 | B1* | 11/2016 | Neporada | G06F 3/067 |
| 9,740,422 | B1* | 8/2017 | Ozdemir | G06F 11/1453 |
| 9,858,418 | B2* | 1/2018 | Coronado | G06F 21/562 |
| 10,887,339 | B1* | 1/2021 | Sokolov | H04L 63/145 |
| 11,080,147 | B2* | 8/2021 | Haustein | G06F 11/1451 |
| 11,477,232 | B2* | 10/2022 | Kulaga | G06F 11/1464 |
| 2006/0053179 | A1* | 3/2006 | Imaizumi | G06F 21/608 |
| 2007/0100905 | A1* | 5/2007 | Masters | G06F 21/568 |
| 2007/0157294 | A1* | 7/2007 | Johnson | G06F 3/0622 |
| | | | | 713/182 |
| 2008/0047013 | A1* | 2/2008 | Claudatos | G06F 21/568 |
| | | | | 726/24 |
| 2008/0195676 | A1* | 8/2008 | Lyon | G06F 11/1469 |

(Continued)

Primary Examiner — Loan L.T. Truong
(74) Attorney, Agent, or Firm — Workman Nydegger

(57) ABSTRACT

One example method includes receiving a request to restore a backed up dataset, checking a tracking catalogue to identify any content of the dataset that is prohibited from being restored, preventing restoration of the content, and restoring all of the dataset, except the content, to a restore target. The prohibited content may be one or more files, or portions of files, and may include malware, confidential information, and personal information.

18 Claims, 5 Drawing Sheets

(56) References Cited

U.S. PATENT DOCUMENTS

| | | | | |
|---|---|---|---|---|
| 2008/0320313 | A1* | 12/2008 | Awad | G06F 21/567 |
| | | | | 713/189 |
| 2012/0030766 | A1* | 2/2012 | Tarbotton | G06F 21/575 |
| | | | | 713/2 |
| 2013/0067576 | A1* | 3/2013 | Niemela | G06F 21/563 |
| | | | | 726/24 |
| 2015/0172304 | A1* | 6/2015 | Kleczynski | H04L 63/1441 |
| | | | | 726/23 |
| 2018/0060591 | A1* | 3/2018 | Dobrila | G06F 21/577 |
| 2019/0042744 | A1* | 2/2019 | Rajasekharan | G06F 21/554 |
| 2019/0188380 | A1* | 6/2019 | Animireddygari | G06F 21/568 |
| 2019/0220364 | A1* | 7/2019 | Yu | G06F 11/1451 |
| 2019/0286534 | A1* | 9/2019 | O'Mahony | G06F 11/1469 |
| 2019/0354708 | A1* | 11/2019 | Fisher | G06F 16/221 |
| 2020/0159433 | A1* | 5/2020 | Miyamura | G06F 3/0643 |
| 2020/0250044 | A1* | 8/2020 | Sharma | G06F 11/1451 |
| 2021/0012002 | A1* | 1/2021 | Rosenthal | G06F 11/1451 |
| 2021/0200641 | A1* | 7/2021 | Bafna | G06F 16/1734 |
| 2021/0200866 | A1* | 7/2021 | Strogov | G06F 21/568 |
| 2021/0319103 | A1* | 10/2021 | Constantinescu | G06F 16/182 |
| 2022/0086173 | A1* | 3/2022 | Yavo | H04L 63/1416 |

* cited by examiner

| FILE | | |
|---|---|---|
| PK | File Name | Char | NAME OF FILE TO REMOVE *(MUST INCLUDE ASSET NAME AND FULL PATH TO IDENTIFY FILE)* |
| | TimeStamp | int | CONTAINS EARLIEST DATE/TIME FROM WHICH INFO SHOULD BE REMOVED. DATES BEFORE THIS SHOULD BE CONSIDERED "OK". A VALUE OF '0' IMPLIES ALL DATES/TIMES |
| | # of Subitems | int | CONTAINS THE # OF OFFSETS/LENGTHS IN THE FILE TO REMOVE. IF THIS IS SET TO 0 THEN THE ENTIRE FILE SHOULD BE REMOVED |
| | Offset/Length List | Char | A "," DELIMITED LIST OF OFFSETS WITHIN THE FILE AND THE LENGTH OF DATA AT EACH OFFSET WHICH SHOULD BE REMOVED |

| FILE | |
|---|---|
| [PK] BobsLaptop:\users\ foo.txt | Char | A FILE ON "BobsLaptop" |
| Jan 10th 2020 | int | APPLIES TO VERSIONS OF THE FILE FROM 1/10/2020 FORWARD |
| 0 | int | REMOVE ENTIRE FILE |
| | Char | N/A |

302

| FILE | |
|---|---|
| [PK] BobsLaptop:\users\ foo.txt | Char | A file on "BobsLaptop" |
| Jan 10th 2020 | int | APPLIES TO VERSIONS OF THE FILE FROM 1/10/2020 FORWARD |
| 2 | int | REMOVE TWO SECTIONS OF THE FILE |
| 100,10;250:30 | Char | REMOVE 10 BYTES AT OFFSET 100 AND 30 BYTES AT OFFSET 250 |

JUST IN TIME REMOVAL OF CORRUPTED INFO AND FILES FROM BACKUPS ON RESTORE

FIELD OF THE INVENTION

Embodiments of the present invention generally relate to handling of selected content on data restore operations. More particularly, at least some embodiments of the invention relate to systems, hardware, software, computer-readable media, and methods for removal of particular content from a backup dataset upon restore of the backup dataset.

BACKGROUND

With the proliferation of malware in datacenters, it is possible that a file or group of files can be infected, and only later does the detection software identify the impacted files. Moreover, data privacy regulations such as the GDPR can dictate that files, or specific information within files, must be removed from primary data as it exists on storage. In both these cases, files are removed from production systems promptly. However, while these impacted files may have been removed from production systems, it is nonetheless possible that copies of these files continue to exist in various backups that have been taken over the time.

Consider, for example, a file that is infected on January $1^{st}$, but the anti-malware detection software does not detect the infected file until 60 days later, on March 1st. During this time, any number of backups may have been taken that include the impacted file. If the customer were taking daily backups, for example, then there would be about 60 backups taken that refer to the infected file. This problem becomes more acute the more infected files are involved.

Conventional data protection products do not provide an effective mechanism to prevent corrupt files and data, or Personally Identifiable Information (PII), that is included in backups, from being re-introduced into the production environment upon restoration of the associated backup dataset that includes the corrupt files/data and/or PII. A brute force approach to this problem might be to remove this information from all backups when informed of the presence of this information by the production environment. However, performing this removal process for all affected backups/files proactively is expensive and a waste of resources since most, if not all, of the backups are unlikely to ever actually be restored.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 2 discloses aspects of an example tracking catalog entry.

FIG. 3 discloses aspects of identifying files, and specific content, for removal from a backup dataset prior to restoration.

DETAILED DESCRIPTION OF SOME EXAMPLE EMBODIMENTS

Figure 1:
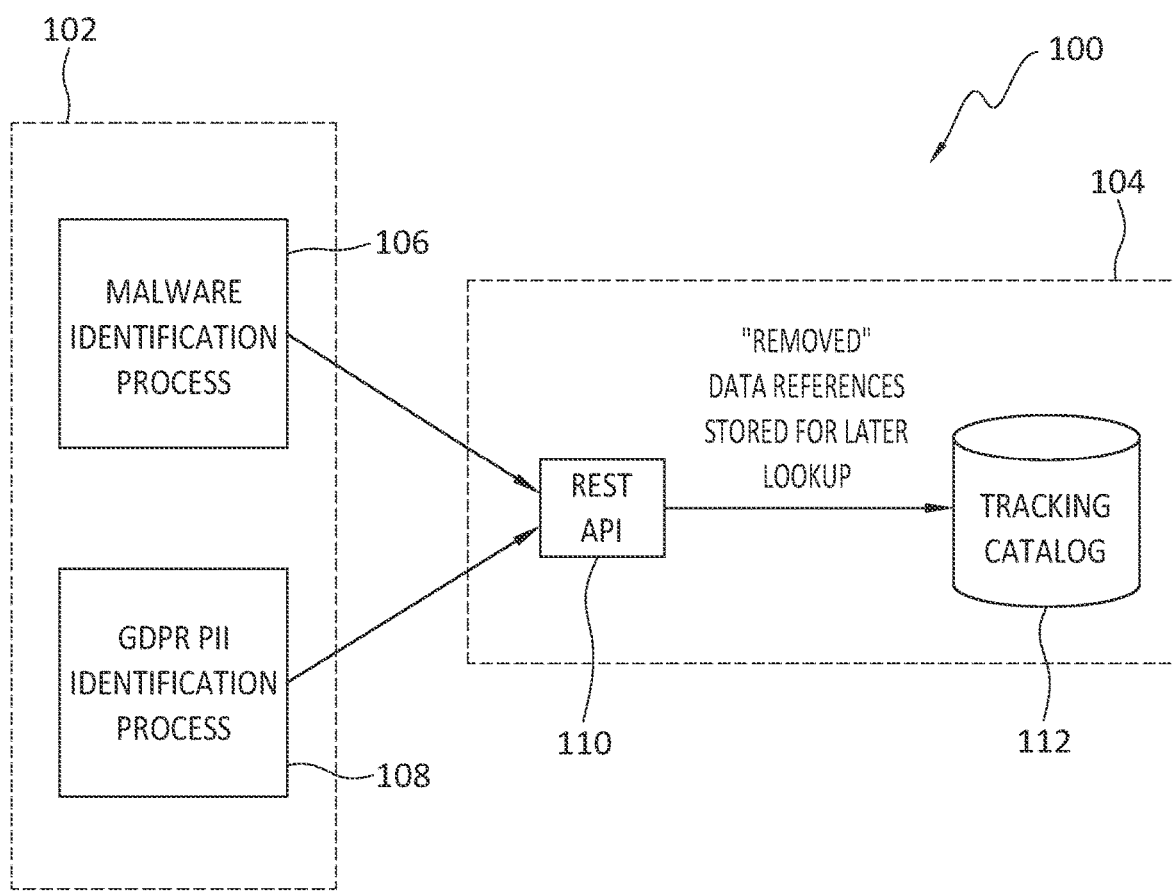
FIG. 1 discloses aspects of an example architecture and process for tracking problematic data and files.

Embodiments of the present invention generally relate to handling of selected content on data restore operations. More particularly, at least some embodiments of the invention relate to systems, hardware, software, computer-readable media, and methods for removal of particular content from a backup dataset upon restore of the backup dataset.

In general, example embodiments of the invention may provide an interface for customer to identify, to a backup subsystem, a set of filenames that correspond to files that have been impacted in such a way that the files, or at least portions of the files, should not be restored for some reason. An impacted file or dataset may include, for example, malware, corrupted data, corrupted code, confidential data, and/or any other type of data/metadata that a user does not wish to have restored, such as to a production site.

Instead of removing the impacted files from any and all impacted backups, the backup system, according to some example embodiments, may instead maintain a catalog of these "removals." Upon restoration of a backup dataset, the backup subsystem may use the tracking catalog to identify whether there are files and/or specific content that should be removed from a backup before a restoration of that backup can occur. In general, the files and/or content may only be removed from the backup if the backup is likely to be restored at some point. Thus, the backup system may only check the tracking catalog, and remove problematic files/content, if at all, after a backup dataset has been designated for restoration. In this way, example embodiments may avoid the processing overhead of unnecessarily removing files from backups that will never be accessed and which may simply expire at the end of their life.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that processing and other workloads may be reduced, relative to systems and operations where content removal is performed regardless of whether or not a backup will be restored, by performing content removal operations only on backup datasets that will actually be restored. An embodiment may prevent restoration of content, such as corrupted data and/or malicious executables, that may compromise the security and integrity of a system and/or its data. An embodiment may help to preserve confidential and/or proprietary information by preventing restoration of content that may comprise confidential and/or proprietary information. Finally, an embodiment may delay removal of problematic files and content until such time as an actual need to do so is identified, so that the amount of processing of such files may be minimized, and so that the processing is delayed until it has been determined that there is a need to perform it.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which numerous large datasets, including backup datasets, may be handled and processed by a data management and/or data backup and restore system. The datasets may be created, and handled/processed, on an ongoing basis. Such handling and processing is well beyond the mental capabilities of any human to perform practically, or otherwise. Accordingly, nothing herein should be construed as teaching or suggesting that any aspect of any embodiment of the invention could or would be performed, practically or otherwise, in the mind of a human.

A. Aspects of Some Example Operating Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, replication, and/or cloning, operations initiated by one or more clients or other elements of the operating environment. Where a backup comprises groups of data with different respective characteristics, that data may be allocated, and restored, to different respective targets in the storage environment, where the targets each correspond to a data group having one or more particular characteristics.

Finally, as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview

As malware and cyber threats continue to proliferate, customers are looking at various ways to secure their systems efficiently. As part of overall security, various types of software like malware detection, anomaly detection, and antivirus, may be run periodically on production systems based on security threats anticipated, resource availability, and/or other considerations. Once this software runs and detects impacted files, the software may allow the customer to quarantine the files and delete the impacted files so that those files cannot be accessed.

This is a desired behavior for production systems. As part of an overall data protection and availability strategy, production systems are backed up periodically, for example, hourly, daily, and/or, monthly. In most cases, the impacted file or set of files have been backed up and reside in the backup system. This can cause havoc if a customer restores the full backup or impacted files without first cleansing the backup dataset of the targeted files. A failure to do so compromises the overall security of the production systems. Further, the problematic file/content may not be detected until after one or more backups of that content have already been performed.

With reference now to FIG. 1, details are provided concerning aspects of some example embodiments, including the example operating environment/architecture 100. In general, a production environment 102 may identify, to a backup system 104 for example, a list of impacted files and potential time of impact to backup subsystem. The production environment 102 may identify these files using, for example, one or more threat identification processes, such as a malware identification process 106, anomaly detection, antivirus scans, and/or other operations. Additionally, or alternatively, the production environment may identify, within the impacted files, PII (Personal Identifying Information) data and/or PCI (Personal Confidential Information)

data. Identification of PII and/or PCI may be performed, in some example embodiments, by an identification process 108, such as a GDPR identification process for example. Identification of an impacted file, and identification of specific data such as PII and PCI within that impacted file, may occur simultaneously, or the file may be identified first, followed by identification of that data.

In cases where a specific set of data, such as PII and/or PCI, within a file or files is identified, the production environment 102 may specify that information via REST API 110, for example. In some embodiments, the REST API 110 may be an element of the backup system 104, or the production environment 102, or may exist as stand-alone entity not included in either the backup system 104 or the production environment 102.

After receipt of the information from the production environment 102 identifying one or more specific files, and possibly also specific respective content within those one or more files, the backup subsystem 104 may store the information in a separate tracking catalog 112, from which that information may be read out by the backup subsystem 104, the production environment 102, and/or by a user.

At some point, the backup subsystem 104 may be requested to perform a restore operation in which data backed up and stored by the backup subsystem 104 may be restored from storage associated with the backup subsystem 104. The data may be restored to one or more target devices, which may or may not be the devices that generated the data in the first instance.

While performing the restore operation, which may take various forms such as, but not limited to an EMC Avamar GLR (Granular Level Recovery) and an FLR (File Level Restore), the backup subsystem 104 may check the tracking catalog 112, identify an impacted file listed in the tracking catalog 112, and skip restoration of that impacted file, or restoration of specified parts of the impacted file. Where part of the file is impacted, for example, the file includes PCI, the impacted portion, that is, the PCI in this example, may be filled with zeros, or otherwise removed or made inaccessible, and notified to the user by mechanism such as a log, or alerts, for example. In this way, the user may be made aware of the existence of the content, and the action taken with respect to that content.

This approach implemented by embodiments of the invention may provide a significant advantage relative to conventional approaches, both in terms of performance and scale. For example, if large sets of files are impacted, the backup system may deal with that circumstance efficiently as it simply adds the files, and/or file metadata identifying the files, it to the tracking catalog, and then prevents access to those files, and/or prevents restoration of the files, or impacted portions of the files, back into production at the time of restore. With the proviso that most backups are never restored, the additional work to do browsing of backup catalog that would typically be required in conventional approaches is not needed.

With reference now to FIG. 2, aspects of an example tracking catalog 200 are disclosed. The tracking catalog 200 may identify one or more files, and/or respective portions of the one or more files, that are prohibited for some reason from being restored to a production site and/or other restoration target. As shown, an entry in the tracking catalog 200 may include a filename, or other information that specifically identifies the file. Particularly, the filename, which may be expressed using one or more characters, may identify the file, and a path by which the file can be accessed.

The tracking catalog 200 may also include a TimeStamp character field that indicates the earliest date/time on or after which the file, or portion of the file, should be removed. If a file version in a backup dataset has a timestamp that precedes the timestamp indicated in the tracking catalog 200, that file version may be considered as safe/acceptable to restore. On the other hand, if a file version has a timestamp on or after the timestamp indicated in the tracking catalog 200, that file version, or selected portions of it, may be removed from the dataset prior to restoration of the dataset. In some embodiments, an integer identifier or value, such as 0, may be used to indicate that no version of the corresponding file should be restored, and any and all versions of that file should accordingly be removed from the dataset prior to restoration.

The tracking catalog 200 may also specifically identify which portion(s) of a file should be removed before that file is restored. For example, the tracking catalog 200 may contain the number of offsets/lengths in the file that should be removed. If this # of SubItems field is assigned an integer value of 0, then the entire file should be removed from the dataset. On the other hand, a value of 2 for example, may indicate that 2 portions of the file should be removed before the file is restored.

Finally, the tracking catalog 200 may include an Offset/Length list that may contain a delimited list of offsets within the file, and the length of the data at each offset which should be removed from the file prior to restoration of the file. The offsets may be delimited in any suitable manner, such as with one or more characters.

With reference now to FIG. 3, an example tracking catalog 300 is tracking two files. The first is an entire file, indicated by a tracking catalog entry, 302 that should be removed upon restoration of a backup. The second, is a file, indicated by a tracking catalog entry 304, containing PII, where only the specific portions of the file containing the PII should be removed.

As indicated in FIG. 3, the filename and path are provided so that the file can be located and accessed. The tracking catalogue entry 302 also specifies that it applies to versions of the file dating from Jan. 10, 2020 forward, and that any such file versions should be removed in their entirety from the dataset before a restore is performed on that dataset. This is indicated by the 0 value in the field concerning the disposition to be made of the file 302. The last field in the tracking catalog entry 302 is empty, that is, no particular portions of the file are designated for removal, since the entire file is to be removed from the dataset.

With regard now to the tracking catalogue entry 304, the filename and path are provided so that the file can be located and accessed. The tracking catalogue entry 304 also specifies that it applies to versions of the file dating from 1/10/20 forward. In contrast with the tracking catalogue entry 302 however, the tracking catalogue entry 304 does not specify that the entire file should be removed, but specifies that only certain portions of the file, 2 in this example, should be removed from the file prior to restoration of the dataset that includes the file. The particular location and length of those 2 portions, which may comprise PII, PCI, malware, or other data/metadata or executables that should not be restored, is specified in the last field of the tracking catalogue entry 304. In this particular example, 10 bytes should be removed beginning at offset 100, and 30 bytes removed beginning at offset 250.

During recovery, from storage, of a dataset that is to be restored, and with continued reference to the example of FIG. 3, it can be seen that the file 'Foo.txt' is not allowed to be recovered or restored based on the tracking catalog entry 302. On the other hand, and with reference to the example tracking catalogue entry 304, the file 'Foo.txt' is allowed to be recovered and restored except for the specific bytes noted in the tracking catalogue entry 304. Those specific bytes may be processed in various ways to ensure that they are not restored along with the file. Such processing may comprise, for example, zeroing the bytes by changing their values to 0, masking the bytes, overwriting the bytes, or deleting the bytes. The particular approach taken to processing of the bytes that are not to be restored may vary based on circumstances. In any event, once those bytes have been processed, the file which contained those bytes may then be restored.

C. Example Methods

Figure 4:
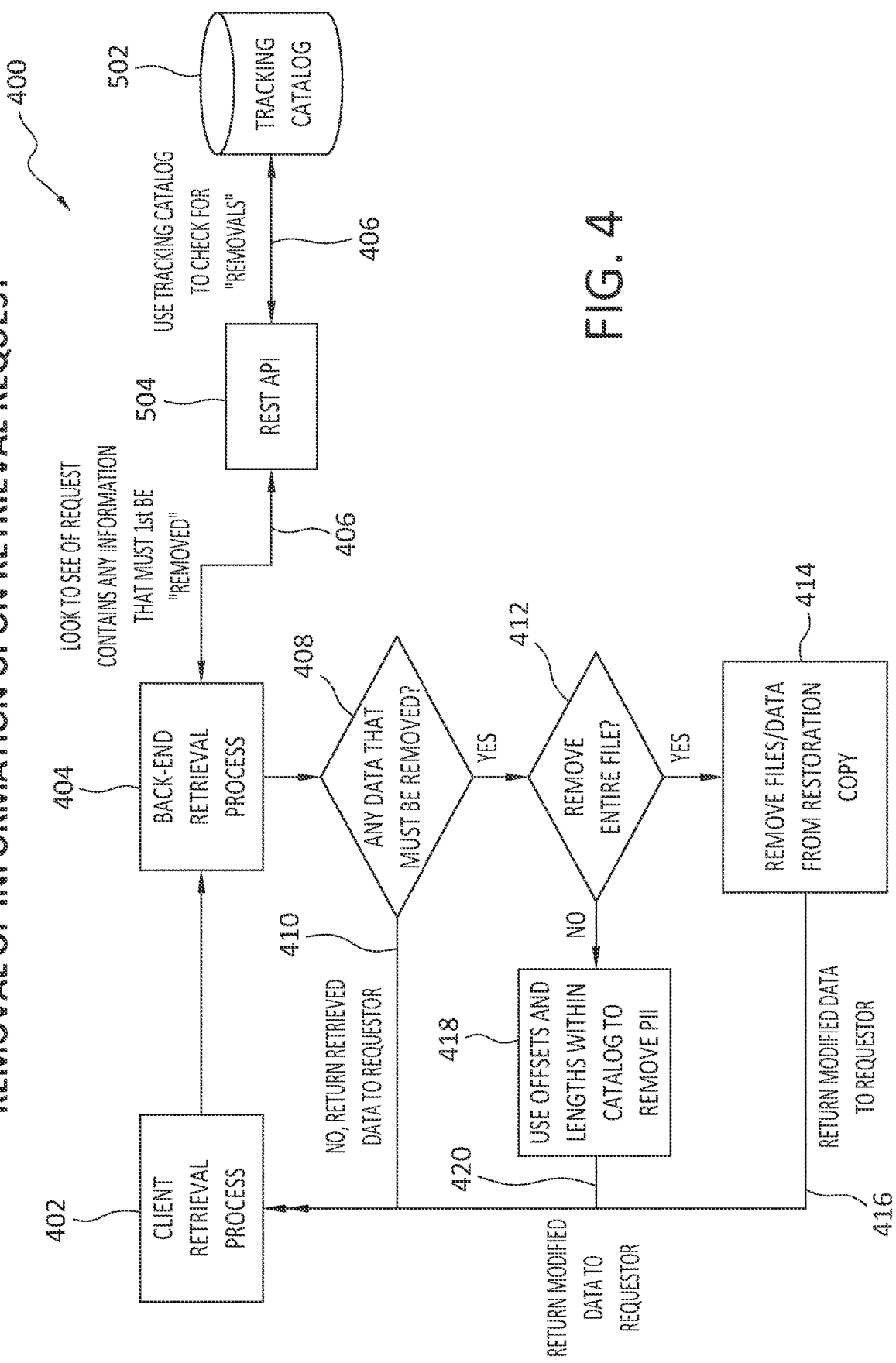
FIG. 4 discloses aspects of process for identify and removing specific files and content from a backup dataset prior to restoration.

It is noted with respect to the example method 400 of FIG. 4 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 4, the example method 400 may begin at 402 when a client, such as a client in a production environment for example, initiates a retrieval process, also referred to herein as a recovery and restore process, for a backup dataset to be recovered and restored to the client and/or other restore targets. The client request may be sent to a backup system for performance of a back end retrieval process 404. Among other things, the back end retrieval process 404 may involve checking 406 to see if the client request specifies any files/content that must be removed from a backup dataset prior to restoration of that dataset. In more detail, the back end retrieval process 404 may communicate with a tracking catalog 502 by way of a REST (Representational State Transfer) API (Application Program Interface) to identify files/content for removal.

After the back end retrieval process has queried 406 the tracking catalog 502, a check 408 may be performed on the results of the query 406 to determine whether or not any files/content have been identified that should be removed before restoration. If the check 408 does not indicate that there are any such files/content, the data requested 402 by the client may be returned 410 to the client.

On the other hand, if the check 408 reveals that there are files/content that should be removed before restoration, a further check 412 may be performed to determine if the entire file should be removed from the dataset before restoration of the dataset. This information may be obtained by examining the tracking catalogue entry during the query 406. If the entire file, or files, should be removed, the method 400 advances to 414 where the identified file(s) is/are removed from the restoration copy, that is, the dataset that is to be restored. The modified dataset, absent the removed file(s) may then be returned 416 to the requesting client.

If the check 412 indicates that only portions of one or more files, and not the entire files, should be removed, then the offsets and lengths specified by the corresponding tracking catalog entries may be used to identify, and remove 418, the content. The remaining content may then be returned 420 to the requesting client.

In some circumstances, performance of the method 400 may result in removal of all impacted files from all backups. Accordingly, some alternative embodiments may provide the additional functionality of a mechanism to find a good copy of a particular file so as to enable recovery of data to any specified point in time. In one example approach, as antivirus/malware system detects that a file is impacted, the tracking catalog may be used to determine when the file is impacted, for example, when a file became infected with a virus. With this information, it may then be possible to restore a version of the file that was backed up before the infection occurred. Thus, not only bad copies of a file may be removed before restoration, but a known good copy of the file be restored. That is, example embodiments may enable, in the case where the requested version of a file is removed because it is infected, the potential restoration of earlier good versions of the file that are not infected. In this case, the backup system may go back to the last-known-good version of a backup to get the impacted file(s) that are still good in old backups.

With reference to the aforementioned alternative embodiment, in some cases, malware software may be updated and detection of a virus, for example, may occur only after the update, in which case it may be preferable to remove infected files, or selected portions or sub-contents of the files, from all backups with infected files, since the time of infection may not be available, or known. Thus, this example alternative embodiment may be employed in circumstances where the customer or client knows the time that a particular file was impacted.

As indicated in the present disclosure, conventional backup systems do not account for information identified for removal from backups. This means that upon requests for restoration, the backup system re-introduces the identified information, which may be a file or a portion of a file, back into the production environment, thereby also reintroducing, into the production environment, any files and/or file content that should have been removed prior to restoration. Accordingly, example embodiments may provide various functionalities including, but not limited to, the ability to remove information Just In Time (JIT) at the point in time when restoration is performed, the ability to remove selected information and/or files from a dataset before restoration of that dataset, and the ability to remove entire files or sections of files in various cases, such as those involving PII and/or PCI.

D. Further Example Embodiments

Following are some further example embodiments of the invention. These are presented only by way of example and are not intended to limit the scope of the invention in any way.

Embodiment 1. A method, comprising: receiving a request to restore a backed up dataset; checking a tracking catalogue to identify any content of the dataset that is prohibited from being restored; preventing restoration of the content; and restoring all of the dataset, except the content, to a restore target.

Embodiment 2. The method as recited in embodiment 1, wherein the content is a subset of a file.

Embodiment 3. The method as recited in any of embodiments 1-2, wherein the content comprises a file.

Embodiment 4. The method as recited in any of embodiments 1-3, wherein preventing restoration of the content comprises removing the content from the dataset before restoring the dataset.

Embodiment 5. The method as recited in any of embodiments 1-4, wherein the tracking catalogue is not checked until after the request to restore is received.

Embodiment 6. The method as recited in any of embodiments 1-5, wherein the content comprises malware, or confidential information.

Embodiment 7. The method as recited in any of embodiments 1-6, wherein information in the tracking catalogue identifying the content is entered in the tracking catalog when the dataset is backed up.

Embodiment 8. The method as recited in any of embodiments 1-7, wherein the content comprises a file, and restoring the dataset comprises restoring a version of the file known, based on a creation time of the version and/or a time when the file was impacted, to consist of data that is not prohibited from being restored.

Embodiment 9. The method as recited in any of embodiments 1-8, wherein the content is known to be prohibited from restoration at a time when the content is backed up.

Embodiment 10. The method as recited in any of embodiments 1-8, wherein the content is not known to be prohibited from restoration at a time when the content is backed up.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
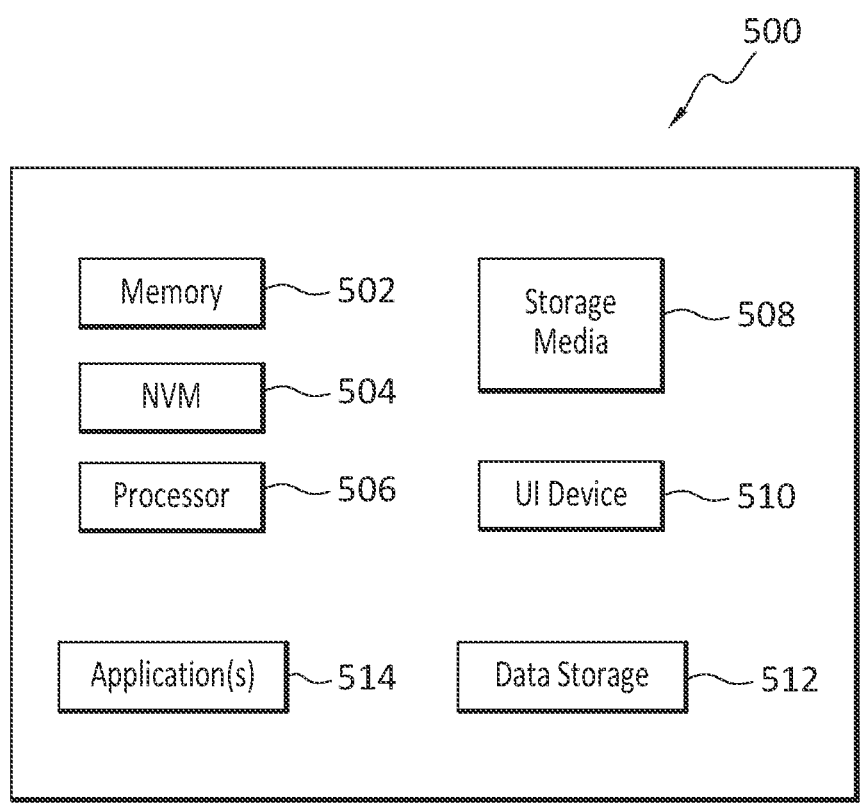
FIG. 5 discloses aspects of an example computing entity operable to perform any of the claimed methods, processes, and operations.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving, from a data production system, a backed up dataset and identification metadata identifying data to be removed from the backed up dataset;
   storing, by a backup system, the identification metadata in a tracking catalogue, wherein the tracking catalogue is separate from the backed up dataset and includes a list of offsets and lengths of data to be removed at each offset;
   receiving, from a requestor, a request to restore the backed up dataset;
   checking a tracking catalogue, which identifies a list of content in the backed up dataset, which is prevented from being restored;
   removing the content from the backed up dataset based on the list of offsets and lengths in the tracking catalogue to generate a modified backed up dataset; and
   restoring the modified backed up dataset to a restore target, and the content is removed from the backed up dataset when the restoring is performed.

2. The method as recited in claim 1, wherein the content in the list is a subset of a file.

3. The method as recited in claim 1, wherein the content in the list comprises a file.

4. The method as recited in claim 1, wherein the tracking catalogue is not checked until after the request to restore is received.

5. The method as recited in claim 1, wherein the content comprises malware, or confidential information.

6. The method as recited in claim 1, wherein information about the list of content is entered in the tracking catalogue when the backed up dataset is backed up.

7. The method as recited in claim 1, wherein the content comprises a file, and
   restoring the backed up dataset comprises restoring a version of the file known, based on a creation time of the version and/or a time when the file was impacted, to consist of data that is not prohibited from being restored.

8. The method as recited in claim 1, wherein the content is known to be prohibited from restoration at a time when the content is backed up.

9. The method as recited in claim 1, wherein the content is not known to be prohibited from restoration at a time when the content is backed up.

10. A computer readable storage medium having stored therein instructions that are executable by one or more hardware processors to perform operations comprising:
    receiving, from a data production system, a backed up dataset and identification metadata identifying data to be removed from the backed up dataset;
    storing, by a backup system, the identification metadata in a tracking catalogue, wherein the tracking catalogue is separate from the backed up dataset and includes a list of offsets and lengths of data to be removed at each offset;
    receiving, from a requestor, a request to restore the backed up dataset;
    checking a tracking catalogue, which identifies a list of content in the backed up dataset, which is prevented from being restored;
    removing the content from the backed up dataset based on the list of offsets and lengths in the tracking catalogue to generate a modified backed up dataset; and
    restoring the modified backed up dataset to a restore target, and the content is removed from the backed up dataset when the restoring is performed.

11. The computer readable storage medium as recited in claim 10, wherein the content in the list is a subset of a file.

12. The computer readable storage medium as recited in claim 10, wherein the content in the list comprises a file.

13. The computer readable storage medium as recited in claim 10, wherein the tracking catalogue is not checked until after the request to restore is received.

14. The computer readable storage medium as recited in claim 10, wherein the content comprises malware, or confidential information.

15. The computer readable storage medium as recited in claim 10, wherein information about the list of content is entered in the tracking catalogue when the backed up dataset is backed up.

16. The computer readable storage medium as recited in claim 10, wherein the content comprises a file, and restoring the backed up dataset comprises restoring a version of the file known, based on a creation time of the version and/or a time when the file was impacted, to consist of data that is not prohibited from being restored.

17. The computer readable storage medium as recited in claim 10, wherein the content is known to be prohibited from restoration at a time when the content is backed up.

18. The computer readable storage medium as recited in claim 10, wherein the content is not known to be prohibited from restoration at a time when the content is backed up.

* * * * *